United States Patent [19]
Zulaski

[11] 4,231,028
[45] Oct. 28, 1980

[54] READY INDICATOR FOR HIGH-VOLTAGE SWITCHGEAR

[75] Inventor: John A. Zulaski, Mount Prospect, Ill.

[73] Assignee: S & C Electric Company, Chicago, Ill.

[21] Appl. No.: 957,275

[22] Filed: Nov. 3, 1978

[51] Int. Cl.³ .............................................. G08B 21/00
[52] U.S. Cl. ..................................... 340/644; 307/64; 340/522
[58] Field of Search ............... 340/644, 648, 658, 521, 340/522; 307/23, 64, 87; 323/76

[56] References Cited

U.S. PATENT DOCUMENTS

| | | | |
|---|---|---|---|
| 2,368,471 | 1/1945 | Horan | 340/648 |
| 2,683,818 | 7/1954 | Smith | 307/64 |
| 2,697,177 | 12/1954 | Burgess et al. | 307/64 |
| 2,830,194 | 4/1958 | Bembenek | 307/64 |
| 2,864,005 | 12/1958 | Ippolito | 307/64 |
| 3,105,182 | 9/1963 | Koppel et al. | 307/64 X |
| 3,108,263 | 10/1963 | Sylvander et al. | 340/648 X |
| 3,265,987 | 8/1966 | Hahnel | 307/64 X |
| 3,329,905 | 7/1967 | Niertit et al. | 307/64 X |
| 4,002,976 | 1/1977 | Zulaski | 323/76 X |
| 4,090,090 | 5/1978 | Johnston | 307/64 X |

Primary Examiner—John W. Caldwell, Sr.
Assistant Examiner—Daniel Myer
Attorney, Agent, or Firm—John D. Kaufmann

[57] ABSTRACT

A "ready" indicator for high-voltage switchgear. The switchgear contains switches having normal positions (opened or closed) and switch operators therefor. The switch operators may include stored energy devices which may be charged or uncharged. The switch operators may be selectively coupled to or decoupled from their respective switches. The switchgear may include an automatic control device which, depending upon circuit conditions, causes operation of the switch operators to operate their respective switches to selected positions. Appropriate sensors detect the presence or absence of certain conditions. For example, the sensors may detect the ability or inability of the automatic control device to effect operation of the switch operators, the position of the switch operator or of the switches (open or closed), the charged or uncharged state of the stored energy devices in the switch operators, and whether or not the switch operators are properly coupled to their switches. The sensors provide signals to logic circuitry, which illuminates a light or energizes some other warning device if and only if all of the switch operators, automatic control devices, etc. are in a predetermined desired condition. The light is not illuminated in the event that any conditions of the switchgear are not appropriate or are other than might be assumed. Appropriate indicia may be associated with the light so that if not illuminated, the human operator is led step by step through a check of the switchgear until he ascertains which assumed condition is not present in preventing illumination of the light.

12 Claims, 2 Drawing Figures

READY INDICATOR FOR HIGH-VOLTAGE SWITCHGEAR

BACKGROUND OF THE INVENTION

1. Field of the Invention

The present invention relates to a "ready" indicator for high-voltage switchgear and more specifically to a "ready" indicator for use with an automatic control device found in high-voltage switchgear which indicates the capability of both the control device and the switchgear to perform their intended functions and to give an indication of such capability to persons not familiar with the internal workings of either the control device or the switchgear.

2. Brief Discussion of the Prior Art

Numerous control systems and detectors for polyphase electrical systems and for equipment containing such systems are well-known. One type of equipment often used or found in polyphase electrical systems is metal-enclosed switchgear which usually contains a series combination for each phase of the system of an interrupter switch and a power fuse. An interrupter switch is an electrical switch which may be manually or automatically operated (opened or closed) as dictated by the requirements of the system or by requirements of loads connected thereto. An interrupter switch has the capability of opening the phase in which it is contained and upon such opening interrupting load currents and currents of lesser magnitude flowing in the phase. Such interruption normally includes the extinguishment or suppression of a high-voltage arc which forms when opening of the phase is attempted. The arc is extinguished or suppressed in a controlled environment so as to cause little if any distress to the switch itself, to the metal-enclosed switchgear in which the switch is contained, or to the electrical system to which this switchgear is connected.

The power fuses serially connected to each interrupter switch are essentially protective devices. Specifically, these power fuses respond to fault currents or other overcurrents flowing in the phase in which they are connected and interrupt such fault currents or other overcurrents upon the occurrence thereof. Interruption effected by the power fuses involves the extinguishment or suppression of the high-voltage arc which is formed incident thereto in a controlled environment so as to cause little if any distress to the electrical system or to other equipment connected thereto.

Often, it is critical or important that certain loads energized by the electrical system not be without electrical power for more than abbreviated times. In this event, two independent electrical sources are often provided, each source containing appropriate switchgear connected thereto. Under normal conditions, one of the sources, often termed a preferred source, is connected to the loads through the interrupter switches in the switchgear connected thereto. The other electrical source is utilized only if the preferred source is unable to supply proper electrical power. The other electrical source is therefore often referred to as an alternate source. Connection of the alternate source to the load therefore involves the opening of the interrupter switches in the switchgear connected to the preferred source and the closing of the interrupter switches in the alternate source.

Any persons, including utility employees, who are responsible for the maintenance, repair, or operation of switchgear, often do not have detailed knowledge concerning the internal working of the switchgear. For example, the switchgear connected to the preferred electrical source and to the alternate electrical source may be of the type in which the interrupter switches in the switchgear connected to the preferred source are normally closed and the switches in the switchgear connected to the alternate source are normally open. The switches may be operated by automatic operators, the operator associated with the normally closed interrupter switches being capable only of automatically opening such switches, and the operator associated with the normally open switches being capable of only closing such switches. Should this be the case, return of both sets of switches to their initial condition requires manual operation. Moreover, either electrical source may be selected to be the preferred source, while the other may be selected to be the alternate source. Because of this, the switchgear may permit the removal of each switch operator and appropriate disassociation thereof from its switches and interchanging the switch operators in the switchgear. Further the switch operators may involve stored energy sources such as springs which may be in a charged or uncharged condition.

Thus, at any given time it may be important for an operator or other person to quickly ascertain the condition, open or closed, or the switches, whether or not the respective switch operators are appropriately coupled to the switches, whether or not the correct switch operator is associated with the correct switch (depending upon which source is the preferred source and which is the alternate source) and whether or not the stored energy source in each switch operator is appropriately charged or capable of operating the operator to open or close the switches associated therewith in the appropriate manner.

There are many other conditions of the switchgear which it is desirable that a human operator be able to quickly ascertain. As noted above, such operators often do not have detailed knowledge of the internal workings of the switchgear. It goes without saying that they also do not have the detailed knowledge of the switch operators.

Accordingly, an object of the present invention is the provision of a "ready" indicator for high-voltage switchgear which is convenient and inexpensive and reliable, and from which a human operator may easily ascertain whether or not the condition of the switchgear is appropriate in view of the requirements and conditions of electrical sources associated with the switchgear and of loads connected thereto.

SUMMARY OF THE INVENTION

With the above and other objects in view, the present invention relates to a ready indicator for high-voltage switchgear. The switchgear is of a type which contains switches having a normal position (opened or closed) and a switch operator therefor. The switch operator may include a stored energy device which may be in a charged or an uncharged state. Moreover, the switch operator may be selectively coupleable to and decoupleable from the switch. The switchgear may also include an automatic control device which, depending upon circuit conditions, causes operation of the switch operator to put the switch in a selected position.

In its broadest perspective therefore, the "ready" indicator of the present invention includes appropriate sensors which detect the presence or absence of certain conditions. For example, the sensors may detect the ability or inability of the automatic control device to effect operation of the switch operator, the position of the switch operator which indicates the position of the switch (opened or closed), charged or uncharged states of the stored energy device in the switch operator, and whether or not the switch operator is properly coupled to the switch. If there are more than one set of switches and additional switch operators therefor, the automatic control device may control the operation of both switch operators and additional sensors may be provided with such additional switch operators, switches and the like for determining the appropriate condition thereof. The sensors provide signals to logic circuitry which effects illumination of a light, or energization of some other warning device, if, and only if, all of the switches, switch operators, automatic control devices and the like found in the switchgear, are in an appropriate condition. The light is not illuminated in the event that the condition of the switchgear is not appropriate or is other than it might be assumed to be. Appropriate indicia may be associated with the light so that if an operator observes that the light is not illuminated, he is led step-by-step through a check of the switchgear until he ascertains which assumed condition is not present and preventing illumination of the light.

DETAILED DESCRIPTION

Figure 1:
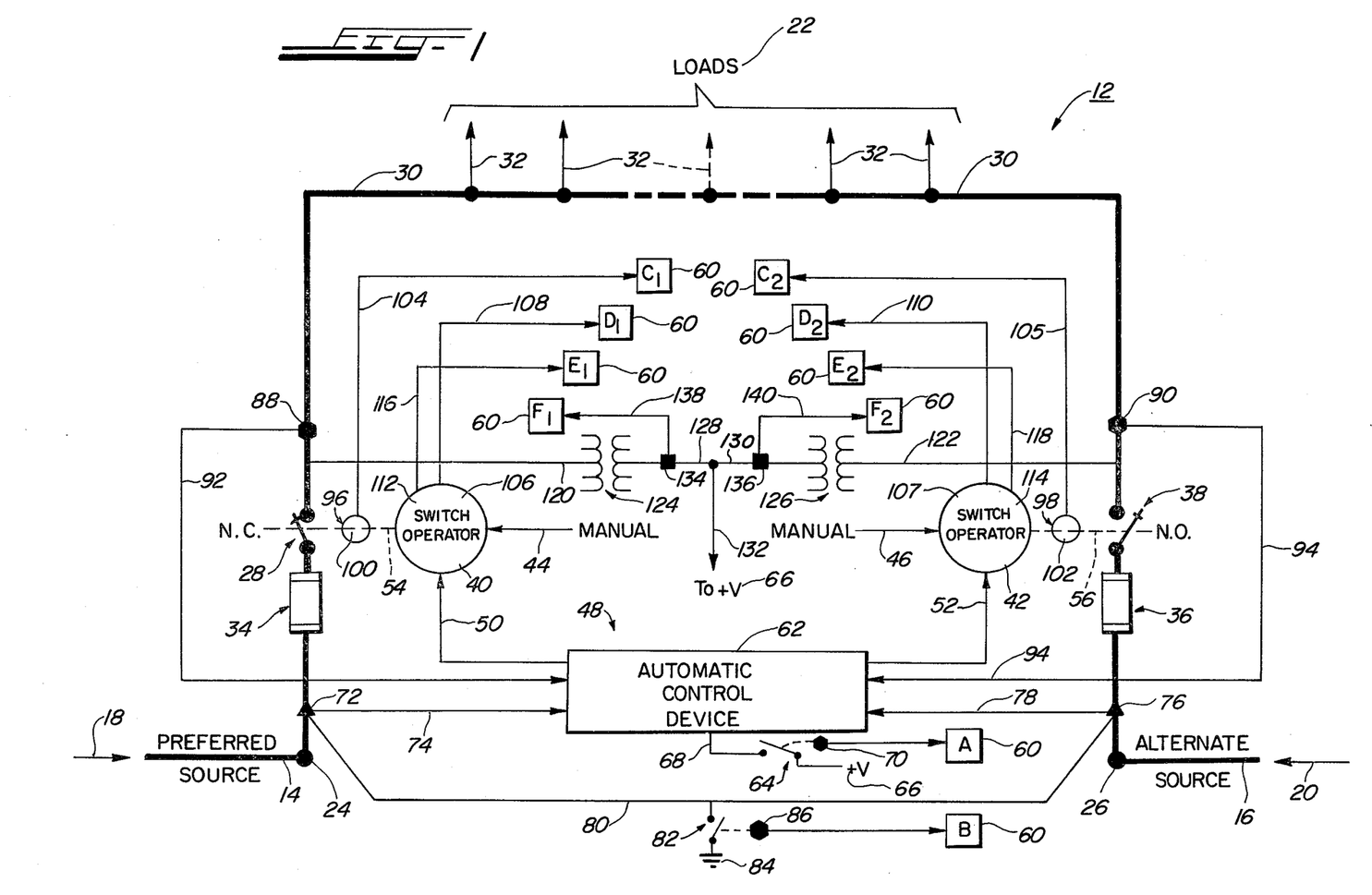
FIG. 1 is a block diagram of a "ready" indicator for high-voltage switchgear according to the principles of the present invention.
Figure 2:
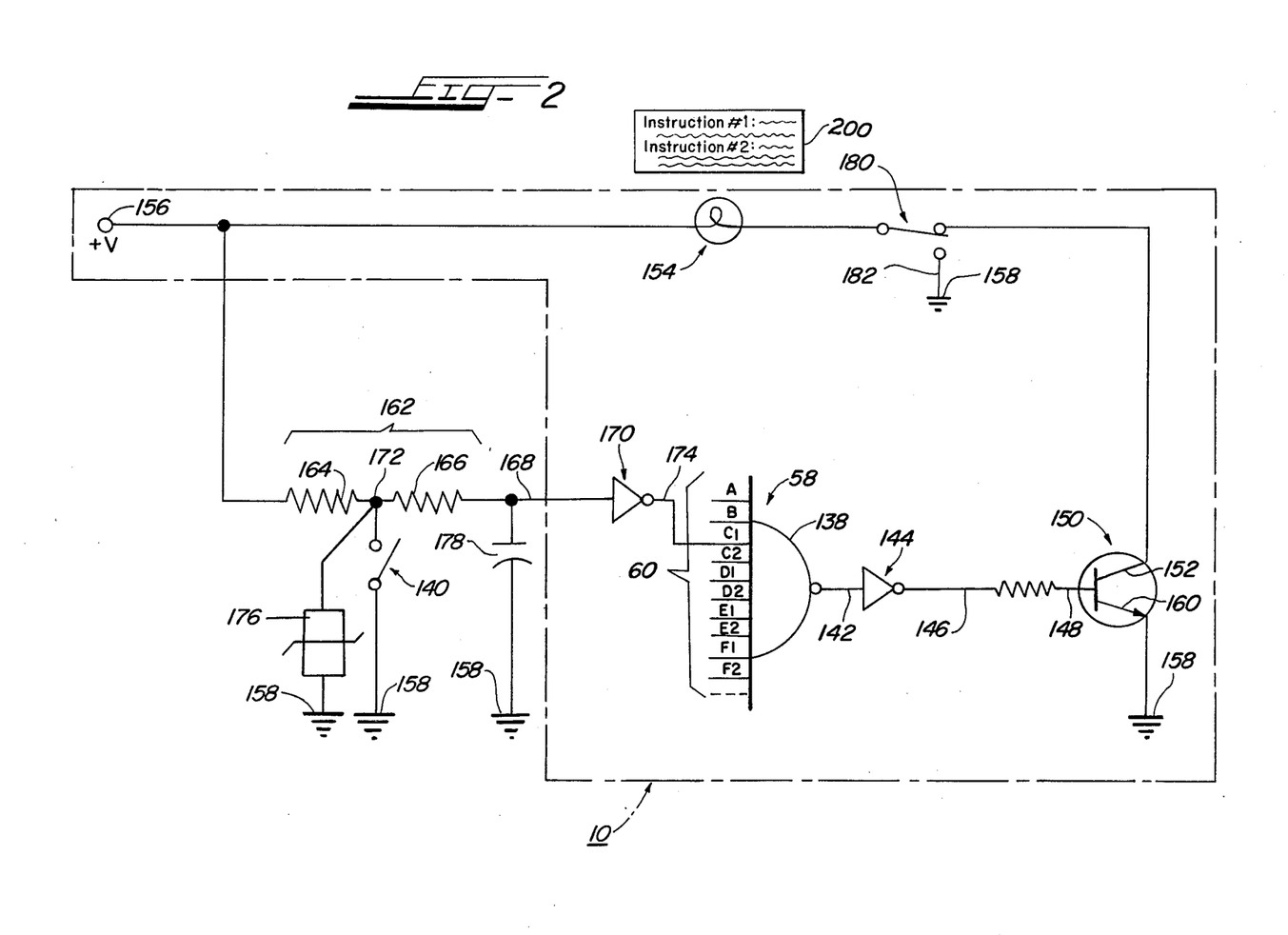
FIG. 2 is an electrical schematic diagram depicting in greater detail a portion of the block diagram of FIG. 1.

A specific example of a "ready" indicator 10 according to the principles of the present invention is depicted in FIG. 2. Before a detailed explanation of FIG. 2 is presented, reference should be had to FIG. 1 so that the environment of use of the "ready" indicator 10 may be more fully explained and so that the novel function and advantages of the "ready" indicator 10 may be more fully appreciated.

Referring to FIG. 1, there is shown a schematic diagram of a portion of high-voltage switchgear 12 with which the "ready" indicator 10 of the present invention is usable. The switchgear 12 includes two input sections 14 and 16 which are respectively connected to a preferred high-voltage source 18 and to an alternate high-voltage source 20. The preferred and alternate high-voltage sources 18 and 20 may be derived from the high-voltage system of a utility and may or may not be in phase. Typically, the sources 18 and 20 will be derived from different portions of the utility system so that in the event one of the sources, say the preferred source 18, fails for any reason, the alternate source 20 may be substituted therefore to supply electrical power to a plurality of loads 22 connected to the switchgear 12. The sections 14 and 16 may constitute appropriate cables or other conductors connected to the switchgear 12 by appropriate connections 24 and 26 which may be potheads, terminators, or the like.

Current flows from the preferred high-voltage source 18 through the switchgear 12 via a normally closed switch 28 to a bus 30. The bus 30 is connected to the loads 22 via appropriate taps 32 thereon. The switch 28 may be an interrupter switch of any well-known type.

Such interrupter switches 28 have the ability of opening the circuit 18-24-24-30-32 while the loads 22 are drawing current from the taps 32. Thus, the switch 28 provides the capability of opening the circuit 18-14-24-30-32 under load conditions and effects the extinguishment of the high-voltage arc that will be formed thereupon in a safe manner which causes no distress to the switchgear 12 or to the utility's electrical system. In series with the switch 28 may be a high-voltage fuse 34 which protects the circuit 18-14-24-30-32 from overcurrents or fault currents in appropriate circumstances as is well-known.

The alternate source 20 is connectable to the bus 30 via a high-voltage fuse 36 and a normally opened interrupter switch 38 which are respectively similar to the fuse 34 and the switch 28.

In the normal condition of the switchgear 12, when the preferred source 18 experiences no difficulty, the switch 28 is closed, supplying electrical power to the loads 22 connected to the taps 32. Should the preferred source 18 experience difficulty, or an inability to supply sufficient power to the loads 22, the normally closed switch 28 is opened and the normally opened switch 38 is closed.

It is to be understood that the circuit 18-14-24-30-38-26-16-20 depicted in FIG. 1 and constituting a portion of the switchgear 12 is a so-called one-line diagram thereof. Specifically, as is well known, high-voltage circuits and switchgear for use therein are generally three phase. FIG. 1 does not depict all three phases of such a three-phase circuit, depicting schematically only a single phase thereof. It is to be further understood that the additional phases of the three-phase switchgear 12 may be schematically depicted similar to FIG. 1. Moreover, as is well-known, the taps 32 may be either three-phase taps or single-phase taps depending on the character of the loads 22 to which they supply electrical power.

The switches 28 and 38 may be respectively operated, that is, opened or closed, by stored energy switch operators 40 and 42 of the type depicted in commonly assigned U.S. Pat. Nos. 2,954,450 and 3,898,420. The switch operators 40 and 42 may be of the type in which a stored-energy device, such as a robust spring, is chargable to either open or close the switch 28 or 38 to which it is connected, depending upon the initial condition of such switch. Moreover, the operators 40 and 42 may be of the type which may be charged-to-open or charged-to-close a switch such as 28 or 38. Further, the switch operators 40 and 42 may be operated either manually, as indicated by the input lines 44 and 46, or may be operated by an automatic or other control device 48 as indicated by the input lines 50 and 52. That is to say, the stored energy operator or spring of the switch operators 40 and 42 may be in its charged-to-open or charged-to-close condition, either by human manipulation of a handle or the like (indicated by the input lines 44 and 46) or by the rotation of a output shaft or other movement of a similar member by a motor (not shown) or other source of motive power contained within the operator 40 and 42 and controlled by the control device 48 (as indicated by the input lines 50 and 52).

The switch operators 40 and 42 are respectively mechanically coupleable to their switches 28 and 38 as indicated by the dashed lines 54 and 56. Preferably, the switch operators 40 and 42 are to the type which may be partially or completely removed from an appropriate compartment (not shown) in a cabinet or enclosure (not shown) housing the switchgear 12. Such removal of the switch operators 40 and 42, not only effects the decoupling thereof from the switches 28 and 38, but also permits the operators 40 and 42 to be adjusted, repaired, maintained or inspected. The switch operators may be interchangeable; the operator 40 may be coupled to the switch 38 and the operator 42 may be coupled to the switch 28.

In operation, and assuming that the preferred source 18 is appropriately supplying electrical power to the loads 22, the switch 28 is closed and the switch 38 is open. Should the preferred source 18 experience difficulty, either a human operator of the control device 48 may operate the switch operators 40 and 42 to first open the switch 28 and then close the switch 38, thus connecting the loads 22 to the alternate source 20. If and when the preferred source 18 is restored, the switch operators 40 and 42 may be operated to first open the switch 38 and then reclose the switch 28 returning the switchgear 12 to its original condition.

Utilities and owners of switchgear 12 utilize employees of various levels of skill. One shortcoming of present day high-voltage switchgear, generally functionally similar to the switchgear 12 of FIG. 1, is that often a detailed understanding of the internal workings thereof is required to properly operate, check, test, or otherwise monitor operation of such switchgear 12. To alleviate this requirement, the ready indicator 10 of the present invention is provided.

As more fully explained below, the "ready" indicator 10 includes a logic gate 58 having a plurality of inputs 60 thereto (see FIG. 2). These inputs 60 are represented in FIG. 1 by a plurality of boxes which are given alphanumeric designations. Also, as more fully explained below, the logic gate 58 and other logical elements associated therewith, may utilize either so-called negative logic or positive logic. For purposes of the description of the present invention it will be assumed that positive logic is utilized, meaning that a "0" is represented by zero or near zero voltage, while a logical "1" is represented by a positive voltage. Accordingly, and referring back again to FIG. 1, each input 60 to the logic gate 58 represents a point at which a positive voltage or a logical "1" is present if a desirable condition with which each input 60 is associated is occurring.

The control device 48 found in the switchgear 12 may be an automatic control device 62 which senses a variety of electrical conditions within or relating to the switchgear 12. See, for example, commonly assigned, co-filed U.S. Pat. Application Zulaski, Ser. No. 957,267, filed Nov. 3, 1978. The automatic control device 62 may be selectively energized by a switch schematically shown at 64 which applies when closed a positive operating voltage 66 thereto on a conductor 68. The positive operating voltage 66 may be derived from any convenient source, but is preferably derived from a source independent of the input sections 14 or 16. Furthermore, when the switch 64 is closed an "automatic mode" of the switchgear 12 is available; this means that depending upon the condition of the sources 18 and 20, the automatic control device 62 will appropriately operate the switch operators 40 and 42 as indicated by the input lines 50 and 52. When the switch 64 is opened, a "manual" mode for the switchgear 12 is in effect; this means that appropriate operation of the switches 28 and 38 must be effected manually as indicated by the input lines 44 and 46 by a human operator to affect the conditions of the switches 28 and 38.

Associated with the switch 64 is an appropriate sensor 70 which is responsive to the condition of the switch 64. The sensor 70 may constitute a microswitch, a photoelectric detector or a direct electrical connection to the conductor 68. In any event, the sensor 70 is of a type which applies a positive voltage or a logical "1" to the input 60 labelled with the letter A when the switch 64 is closed to energize the automatic control device 62. When the switch 64 is opened, thus de-energizing the automatic control device 62, there is present at the input 60 labelled A a logical "0".

Appropriately associated with the input section 14 on the source side of the fuse 34 may be a sensor 72. See commonly assigned U.S. Pat. No. 4,002,976 to Zulaski. One sensor 72 may be provided for each phase of the three-phase conductors represented by the input section 14. The sensors 72 transmit appropriate signals along an input line 74 to the automatic control device 62. The sensors 72 and the automatic control device 62 measure both the magnitude of the time-varying voltages on each of the conductors 14 as well as measure or detect the phase angle therebetween. In this way, the sensor 72 and the automatic control device 62 cooperate to determine if an appropriate three-phase electrical signal is incoming from the preferred high-voltage source 18. A sensor 76 is associated with the input section 16 and is similarly connected by an input line 78 to the automatic control device 62 to the same end. Thus, when the automatic control device 62 is called upon to affect the condition of the switches 28 and 38, part of its decision making process will depend upon the suitability of the sources 18 and 20 as determined by the sensors 72 and 76 and the signals present on the input lines 74 and 78.

The sensors 72 and 76 and the portions of the automatic control device 62 to which they are connected by the input lines 74 and 78, may be of a type which are normally energized to perform their judgmental function whenever the automatic control device 62 is energized by closure of the switch 64. If it is desired to defeat the function of the sensors 72 and 76 and those portions of the automatic control device 62 to which they are connected for test or other purposes, there may be provided a ground conductor 80 connected through a normally open switch 82 and from there to ground 84. The ground conductor 80 may be appropriately connected to the sensors 72 and 76, the input lines 74 and 78, or appropriate portions of the automatic control device 64. When the switch 82 is open, the sensors 72 and 76 and the automatic control devices 62 are capable of analyzing and making judgments based on the magnitude and the phase angles of the voltages of the respective sources 18 and 20. If the switch 82 is closed, the sensors 72 and 76 are grounded, thus preventing the automatic control device 62 from affecting the condition of the switches 28 and 38 in response to the condition of the sources 18 and 20.

Associated with the switch 82 is a sensor 86 which may be similar to the sensor 70. Regardless of the nature of the sensor 86, it applies to the input 60, labelled B, a positive voltage or a logical "1" if the switch 82 is open; if the switch 82 is closed, the sensor 86 provides at the input 60, labelled B, a logical "0".

Also associated with the input sections 14 and 16 on the load side of the fuses 34 and 36 may be, sensors 88 and 90, respectively. These sensors 88 and 90 may be similar to the sensors 72 and 76. The sensors 88 and 90 are associated with the input sections 14 and 16 so as to transmit on respective input lines 92 and 94 to the automatic control device 62, signals indicative of the voltage magnitude and phase orientation on the phase conductors of the three-phase input sections 14 and 16. The automatic control device 62 leaves switch operators 40 and 42 unaltered as long as the magnitude and the phase orientations of the voltage of the input section 14 remains within predetermined limits. Should the voltage of one or more of the phase conductors of the input sections 14 fall below the predetermined minimum value, the automatic control device 62 operates the switch operator 40 to open the switch 28 and closes the switch 38 by operation of the switch operator 42.

The sensors 88 and 90, as noted above, are sensitive to and cause the automatic control device 62 to operate the switch operators 40 and 42 in response to, among other things, an improper phase relationship between the voltages occurring on the three phases of the sources 18 and 20. For example, assuming switch 28 to be closed, and switch 38 to be open, if a phase-to-ground-fault occurs in one phase of the preferred source 18, the fuse 34 in that phase may operate to interrupt current in the phase. Following such fuse operation, with the other two phases of the preferred source 18 still energized to the bus 30 and the loads 22, there is a danger that so-called single phasing may occur. As is well-known, single phasing may damage three-phase loads 22. The automatic control device 62 now responds to the improper phase relationship between the voltages in the phases because one of the sensors 88, associated with the faulted and interrupted phase is transmitting on the input line 92 an indication that such phase has been interrupted. Accordingly, the automatic control device 62 causes, via input line 50, operation of the switch operator 40 to open the switch 28. Following such opening, the automatic control device 62 causes operation of the switch operator 42 via the input line 52 to close the switch 38, thus permitting the loads 22 to draw electrical power from alternate source 16.

As should be clear, unless the switch 64 is closed and the switch 82 is open, the automatic control device 62 is unable to effect automatic transfer from the preferred source 18 to the alternate source 20 in the event that the preferred source 18 is supplying other than the intended electrical power to the loads 22. Conveniently, then, it should be possible to quickly ascertain if the switches 64 and 82 are in their intended position should later automatic operation of the automatic control device 62 be desired. Such quick inspection is provided by the "ready" indicator 10 of the present invention described in greater detail below.

As noted earlier, the switch operators 40 and 42 are respectively coupled to their switches 28 and 38 as indicated schematically by the dashed lines 54 and 56; also, the switch operators 50 and 42 are removable from the cabinet or enclosure (not shown) housing the switchgear 12. This coupling and uncoupling of the switch operators 40 and 42 to and from their respective switches 28 and 38 is indicated by reference numerals 96 and 98. Reference numerals 96 and 98 represent any of a well-known variety of mechanical couplings which permit selective coupling of the switch operators 40 and 42 to their switches 28 and 38. Incorporated into or associated with the couplings 96 and 98, are respective sensors 100 and 102. The sensors 100 and 102 may be microswitches, photoelectric devices, or any other convenient device which provide a positive voltage or a logical "1" on conductors 104 and 104, if, and only if, the respective switch operators 40 and 42 are properly coupled to their switches 28 and 38 through the couplings 96 and 98. This positive voltage, or logical "1", is applied to respective inputs 60 to the logic gate 58 labelled, respectively, $C_1$ and $C_2$. As should be obvious, regardless of the condition (opened or closed) of the switches 28 or 38, proper automatic operation of the switchgear 12 by the automatic control device 62 requires that both switch operators 40 and 42 be coupled to their switches 28 and 38. If either switch operator 40 or 42 is not connected to its switch 28 and 38, its associated input 60 will have present thereon a logical "0".

As noted earlier, both switch operators 40 and 42 include a stored energy device such as a spring. The operators 40 and 42 may be in either a charged-to-open, or a charged-to-close condition. Generally, the sources 18 and 20 will be derived from different portions of the utilities electrical system. Accordingly, the sources 18 and 20 will generally not be in phase. As a consequence, if the switch 28 is opened, then the switch 38 must be closed; conversely, if switch 28 is closed, then the switch 38 must be open. This leads to the conclusion that, if the switch operator 40 has previously placed its switch 28 in the closed position, the switch operator 40 is in the charged-to-open condition; also the switch operator 42 must have previously opened its switch 38, and should be in the charged-to-close position. The reverse of this situation also obtains. Because the normal condition of the switchgear 12 is for the switch 28 to be closed, and the switch 38 to be open, the switch operator 40, should be in a condition indicative of closure of the switch 28; the switch operator 42 should be in a position indicative of the switch 38 being open. As a consequence, sensors 106 and 107 are incorporated into or associated with the switch operators 40 and 42, giving an indication of the condition thereof. If, and only if, the switch operator 40 is in a condition indicating that the switch 28 is closed, a logical "1" is provided on a conductor 108 to the input 60 labelled $D_1$. By the same token, if and only if, the switch operator 42 is in a condition indicative of the switch 38 being open, does the sensor 106 provide a signal on a conductor 110, which signal is a logical "1". Such signal is applied to the input 60 of the logic gate 58 labelled $D_2$. Conversely, if the switch operator 40 is in a condition indicative of the switch 28 being open, or if the switch operator 42 is in a condition indicative of the switch 38 being closed, the inputs 60 labelled $D_1$ and $D_2$ have present thereon a logical "0".

Numerous other inputs 60 may be provided depending on the structure, intended operation and function of the switchgear 12. Some alternative or additional inputs are described hereinafter.

As previously mentioned, the switch operators 40 and 42 are of the type having a stored energy source or spring therein for operation of the switches 28 and 38. Also as noted previously, the operators 40 and 42 may be in either a charged-to-open or a charged-to-close state. Accordingly, the switch operators 40 and 42 may also include or have associated therewith, sensors 112 and 114, which may be similar to the sensors 104 and 106. The sensors 112 and 114 detect or otherwise give an indication of the charged or uncharged state of the stored energy member in the switch operators 40 and 42. Thus, if either of the springs in the switch operators 40 and 42 are charged, the sensors 112 and 114 provide on respective conductors 116 and 118, positive voltage or logical "1" signals which are respectively fed to inputs 60 labelled $E_1$ and $E_2$. Thus, the simultaneous condition of the input 60 labelled D and E for each operator 40 and 42 yields an indication of the charged-to-open or charged-to-closed condition of each operator 40 and 42. Specifically, if a logical "1" is present at both inputs 60 labelled $D_1$ and $E_1$, it is known that the switch 28 is closed and that the switch operator 40 is in the charged condition. If the input 60 labelled $D_1$ has a logical "1" present thereat, but the input 60 labelled $E_1$ has a logical "0" thereat, it is known that the switch 28 is closed, but the operator is not charged. Similarly, if input 60 labelled $D_1$ has a logical "0" thereat, and the input 60 labelled $E_1$ has a logical "1" thereat, it is known that the switch operator 40 is charged and that the switch 28 is open. A similar analysis of the inputs 60 labelled $D_2$ and $E_2$ related to the switch operator 42 may be made.

It may also be desirable to give a sensible indication of the ability of the automatic control device 62 to automatically control the state of the switchgear 12. Specifically, even assuming that the switches 64 and 82 are in their proper positions, it is possible that the transformed voltage derived from the sources 18 and 20 used to supply the operating voltages 66 to the automatic control device 62 is improper. As noted earlier, this operating voltage 66 may be derived from the sources 18 and 20. A signal from the respective sources 18 and 20, proportional to the voltage thereon, may be provided on respective conductors 120 and 122. These signals may be appropriately transformed by transformers 124 and 126 to produce the operating voltage 66 for the automatic control device 62 on conductors 128 and 130. Both conductors 128 and 130 are connected to a conductor 132 from which is ultimately derived the operating voltage 66 for the automatic control device 62 as shown. Appropriate sensors 134 and 136 provide on respective conductors 138 and 140 signals indicative of whether the voltage on the conductors 128 and 130 is sufficiently high to produce an appropriate operating voltage 66 for the automatic control device 62. If, and only if, the operating voltage 66 is sufficiently high to properly operate the automatic control device 62 is there provided at respective inputs 60 labelled $F_1$ and $F_2$ a positive voltage or logical "1". If the voltage 66 is below that at which the automatic control device 62 will properly operate, present at the inputs 60 labelled $F_1$ and $F_2$ are low or no voltage signals, or logical "0".

Turning now to FIG. 2, there is described in greater detail, the ready indicator 10 according to the present invention. As previously noted, the ready indicator includes a logic gate 58 which in the specific embodiment depicted is a NAND gate 138. The inputs 60 are fed to the NAND gate 138 as depicted, the alphanumeric designations labelling each input 60 corresponding to the labelled boxes in FIG. 1. Some of the inputs 60 to the NAND gate 138 may be fed directly thereto without any electrical or electromechanical transformation thereof. Specifically, although the inputs 60 labelled A, B, $F_1$ and $F_2$ in FIG. 1, are shown connected to the sensors 70, 86, 134 and 136, respectively, such sensors need not be used. More specifically, the input 60 labelled A may be connected directly to the conductor 68. If, and only if, the switch 64 is closed, thereby applying the operating voltage 66 to the automatic control device 62 is a positive voltage or logical "1" present at the input 60 labelled A. Similarly, the input 60 labelled B may be connected directly to the ground conductor 80. If, and only if, the switch 82 is open is there a positive voltage or a logical "1" applied to such input; if the switch 82 is closed, the ground conductor 80 is grounded and a low or no voltage or logical "0" is applied to the gate 60 labelled D. Moreover, the conductors 138 and 140 may be connected directly to the conductors 128, 130 respectively. If, and only if, the voltage on such conductors 128 and 130 is above a certain minimum value is a sufficiently high positive voltage or logical "1" applied to the input 60 labelled $F_1$ and $F_2$.

Other inputs 60 such as those labelled $C_1$, $C_2$, $D_1$, $D_2$, $D_2$, $E_1$ and $E_2$ in Fig. 2 may depend on the open or closed position of a switch or the like generally depicted at 140 in FIG. 2, for the application of a logical "1" or a logical "0" thereto. For the present discussion, it will be assumed that the sensors 100, 102, 104, 106, 112 and 114 may include or represented by such a switch 140. As noted previously, these sensors and accordingly the switch 140 may take the form of a microswitch, a photoelectric detection circuit, a fiber optic detection circuit, or the like. All that is necessary is that such sensors provide either a logical "1" or a logical "0" depending upon the condition being sensed, and its presence or absence.

Assuming for the time being that all of the inputs 60 to the NAND gate 138 are logical "1's", the output of the NAND gage 138 applied to a conductor 142 is a logical "0". This logical "0" is applied to the input of an invertor or NOT gate 144. The presence of a logical "0" at the input of the NOT gate 144, produces a logical "1" on the output conductor 146 thereof. Such logical "1" is applied to the base 148 of an NPN transistor 150 utilized as a simple binary switch. Applied to the collector 152 of the transistor 150 via a series-connected indicating light 154, is a bias voltage 156 which may be the same as or different from the operating voltage 66. Because of the presence of a logical "1" on the base 148 and the bias voltage 156 on the collector 152 of the transistor 150, the transistor 150 is turned "on", and a path to ground 158 is provided for the bias voltage 156 through the indicating light 154 via the emitter 160 of the transistor 150. Accordingly, the indicating light 154 is illuminated providing a visual indication that all of the inputs 60 to the NAND gate 138 are logical "1's". As described herein, the presence of logical "1's" on all of the inputs 60 is indicative of the complete readiness of the automatic control device 62. to properly automatically control the condition of the switchgear 12 and of the proper condition of the switchgear 12, especially of the switches 28 and 38. As to the sensors 100, 102, 104, 106, 112 and 114 which may be properly schematically depicted as represented by the switch 140, FIG. 2 also represents in a schematic fashion a representative way of deriving logical "1's" on the inputs 60 labelled $C_1$, $C_2$, $D_1$, $D_2$, $E_1$, and $E_2$. Specifically, the bias voltage 156 may be fed through a voltage divider 162, including a pair of series resistors 164 and 166 to the input 168 of an invertor or NOT gate 170. A center tap 172 between the resistors 164 and 166 may be connected in series with the switch 140 to ground 157. The switch 140 may be a normally open switch. The bias voltage 156 is of a sufficient positive magnitude to represent a logical "1" considering the effect of the resistors 164 and 166. As long as the switch 140 remains open, such logical "1" is applied to the input 168 of the NOT gate 170. Thus, there appears on the output 174 of the NOT gate 170 (the output 174 being the same as the input 60 labelled $C_1$) a logical "0". As is well-known, if one input to a NAND gate is a logical "0", the output thereof is a logical "1" regardless of the condition of other inputs thereto. Thus, with a "0" present on the output 174 and on the input 60 labelled $C_1$ of the NAND gate 138, there is a "1" on the output 142 from the NAND gate 138. This produces a "0" on the output conductor 146 of the NOT gate 144. Such "0" does not bias the base 148 of the transistor 150 sufficiently to permit the transistor 150 to turn "on" and accordingly, indicating light 154 does not become illuminated. The inputs 60, labelled $C_2$, $D_1$, $D_2$, $E_1$ and $E_2$ may be connected to output conductors similar to the output conductor 174 and similarly, connected to voltage dividers and switches similar to the voltage divider 162 and the switch 140. If the switch 140 is closed, a "1" is present on the input $C_1$. Unless all of the inputs 60 have present thereon a logical "1", the indicating light 154 is not illuminated. There is thus provided a readily ascertainable indication of the proper condition of both the switchgear 12 and the automatic control device 62 which does not require a detailed knowledge of internal structure of functioning thereof.

The center tap 172 may also be connected to ground 158 via a series varistor 176. The varistor 176 serves a protective function for the circuit schematically depicted in FIG. 2 in that should a voltage surge occur at the bias voltage 156, the varistor 176 breaks down and conducts such high level signal to ground protecting the circuitry. Similarly, the input 168 of the NOT gage 170 may be connected to ground 158 via a series capacitor 178. The capacitor 178 prevents spurious high frequency harmonics or transients from placing a false "1" on the input 60 connected to the NOT gate 170.

Referring again to FIG. 2, there are shown additional optional facilities for checking the condition of the indicating light 154. Specifically, it may be desired to provide a way of determining whether the indicating light 154 is capable of being illuminated to avoid the false impression that switchgear 12 and the automatic control device 62 are properly configured or are capable of appropriately controlling electrical power to the loads 22. More specifically, a push-to-test switch 180 may be provided which in its normal position completes a series circuit between the indicating light 154 and the collector 152 of the transistor 150. When it is desired to test for the operability of the indicating light 154, the push-to-test switch 180, is operated in such a way as to momentarily connect the indicating light 154 to ground 158 through a conductor 182. Release of a push-to-test switch 180 reconnects the indicating light 154 to the collector 152. If the indicating light 154 is incapable of illumination, momentary operation of the push-to-test switch 180 will not cause illumination thereof. On the other hand, if the indicating light 154 is capable of operating, such momentary operation of the push-to-test switch 180 will cause illumination thereof.

It should be noted that the indicating light 154 may be replaced by other well-known sensible indicators. Specifically, an audible alarm, a flashing vividly colored indicator light, or a relay, may be substituted for the indicating light 154 to provide an appropriate indication at an appropriate location of the readiness or not of the switchgear 12 and the automatic control device 62 to transfer the loads 22 between the sources 18 and 20, depending on the condition of such sources 18 and 20.

The ready indicator 10 of the present invention may include appropriate indicia or instructions 200 near or in the vicinity of the indicating light 154. The instructions 200 may instruct all, including the less sophisticated operator, of appropriate steps to take, depending on the condition of the indicating light 154. For example, should the operator assume that the switchgear 12 and the automatic control device 62 are in appropriate conditions to properly supply electrical power to the loads 22 depending upon the condition of the sources 18 and 20, but should the indicating light 154 also not be illuminated, instruction number 1 may direct the operator to first momentarily operate the push-to-test switch 180 to determine if the indicating light 154 is illuminable. Instructions may go on to direct that, should momentary operation of the push-to-test switch 180 inform that the indicating light 154 is illuminable, but is nevertheless not illuminated, the operator may be next instructed to visually ascertain the opened or closed condition of the switches 28 and 30. As described above, if the switch 28 is closed, and the switch 38 is opened, there are necessary but not necessarily sufficient conditions present for illumination of the indicating light 154. Should the operator ascertain by visual observation that the switch 28 is open, and/or the switch 38 is closed, then he knows the reason for the lack of illumination of the indicating light 154 and that the switchgear 12 is not in the assumed condition. Should the switch 28 and the switch 38 be in their assumed respective closed and opened conditions, instruction number 2 may next direct the operator to ascertain that the switch operators 40 and 42 are properly coupled thereto via the couplings 96 and 98. This determination may be simply a manual, physical check, that the switch operators 40 and 42 are pushed into or otherwise properly located in the cabinet or enclosure (not shown) for the switchgear 12. Should the operator determine that the switch operators 40 and 42 are appropriately coupled to their respective switches 28 and 38, the instruction number 3 may next direct him to ascertain that the switch operator 40 is in the charge-to-open condition and that the operator 42 is in the charge-to-close condition. Should the opertors 40 and 42 be in their appropriate conditions, and should their stored energy operators also be appropriately charged, instruction number 4 may next direct the operator to ascertain by an appropriate electrical check that the voltage of the sources 18 to 20 are appropriate. It should be noted that various components of the switchgear 12 could be in other than the assumed condition due to a previous manual operation of the switch operators 40 and 42 and their associated switches 28 and 38, which manual operation is unknown to the operator who is ascertaining the condition of the indicating light 154. Similarly, previous maintenance, testing or repair of switchgear 12 may have placed various components thereof in other than the assumed condition.

Additional inputs 60 as indicated by the broken-line input 60 to the NAND 138 may also be provided, thus requiring additional conditions be present before the indicating light 154 is illuminated. Examples of such additional conditions which may be appropriately utilized by the NAND gage 138 via appropriate sensors, are that the sources 18 and 20 are synchronous, that the frequency of either source 18 or 20 is within tolerance, that the load currents flowing in the bus 30 and the taps 32 to the loads 22, are within the interrupting limits of the switches 28 and 38 and/or the fuses 34 and 36, that remote switches, fuses, breakers, or relays are in desired predetermined modes, or that any other condition of the switchgear 12 of the automatic control device 62 of the sources 18 or 20, or the loads 22, exists.

The above-described apparatus may take one of at least two different configurations. The first configuration is called "one-way source transfer" in which a loss of the preferred source 18 or reduction thereof to a predetermined level for a predetermined period of time results in opening of the switch 28 by the switch opertor 40, followed by closing of the switch 38 by the switch operator 42. Regardless of the condition of the sources 18 and 20 thereafter, the switch operators 40 and 42 may be resettable to their respective charged-to-open and charged-to-close conditions only by manual operation thereof indicated by the input lines 44 and 46. Such manual operation not only restores the operators 40 and 42 to their appropriate charged condition, but also results in the manual reclosing of the switch 28 and opening of the switch 38. Of course, as described above, during the time that the switch 28 is open the switch 38 is closed, the indicating light 154 is not illuminated, thus alerting the observer to the fact that a source transfer may have taken place. In this configuraion the switch operator 40 can be only in the charged-to-open condition, the operator 40 not having the capability of being charged-to-close. Similarly, the switch operator 42 can only be charged-to-close, and may not be in a charge-to-open condition. Nevertheless, if preferred, the switch operators 40 and 42 which are removable from the cabinet or enclosure (not shown) for the switchgear 12 may be interchangeable. This interchangeability permits either source 18 or 20 to be treated as the preferred source, while the other source 20 or 18 is is treated as the alternate source. Should this be the case, it must be remembered that the switch operator 40, having the capability of being only in the charge-to-open condition, must be associated with whichever switch 28 or 38 is associated with the preferred source while the other switch operator 42 must be associated with the alternate source. Consequently, the automatic control device 62 may have female plugs (not shown) or the like, one of which is uniquely associable with the input line 50 or 52 connected to the switch operator to the switch operator 40 or 42, associable with the preferred source, and a second female plug associable only with the input line 50 or 52 connected to the switch operator 40 or 42, which operates the switch 28 or 38 for the alternate source. Because the automatic control device must be associated with the appropriate switch operators 40 and 42 in the proper manner, the female plug in the automatic control device 62 may have associated therewith, appropriate sensors indicating that the proper input line 50 or 52 is associated with the proper female plug. These sensors may provide additional inputs for the NAND gate 138 so that if, and only if, switch operators 40 and 42 were properly associated with the automatic control device 62 is the indicating light 154 illuminated.

In a second configuration of the above described apparatus, referred to as "two-way source transfer," both switch operators 40 and 42 have the capability of being in either a charged-to-open or a charged-to-close condition. In this configuration, the switchgear 12 transfers the loads 22 from the preferred source 18 to the alternate source 20 if the preferred source 18 is lost or experiences a significant reduction of voltage for a pre-determined period of time. Following such transfer to the alternate source 20, a retransfer back to the preferred source 18 occurs, when such preferred source 18 reassumes its proper state.

As should be obvious to those skilled in the art, additional configurations embodying the principles of the present invention are also possible. For example, the appratus may assume a "two-way soruce transfer with bus-tie-switch" configuration in which the bus 30 contains a switch (not shown) similar to the switches 28 and 38 for selectively picking up loads 22 connected to appropriate taps 32 on either side of the bus-tie siwtch. The proper condition of this switch (open or closed) and of a switch operator (not shown) associated therewith, may provide additional input for the NAND gate 138 along the lines of the function described above.

It is to be understood that the above-described embodiments are simply illustrative of the principles of the present invention. Various other modifications and changes may be devised, but those skilled in the art which will embody the principles of this invention yet fall within the scope and spirit thereof.

I claim:

1. A ready indicator for switch-gear usable in a high-voltage electrical system; the switch-gear being of the type having an interrupter switch in a normal first position, the switch being selectively movable to a second position by a switch operator selectively energized by a selectively actuable control device responsive to electrical conditions of the system, the indicator comprising
   first means for generating a first signal if the switch is in the first position;
   second means for generating a second signal if the switch operator is capable of moving the switch to the second position;
   third means for generating a third signal if the control device is capable of energizing the switch operator; and
   first indicating means for producing a human-sensible indication of the simultaneous generation of the signals.

2. A ready indicator as recited in claim 1, further comprising
   second indicating means for indicating the significance of the absence of the human-sensible indication.

3. A ready indicator as recited in claim 2 for switchgear of the type in which the switch operator is selectively coupleable to the switch and the switch operator includes a stored energy source which may be charged or uncharged, wherein the second means comprises
   fourth means for generating a fourth signal if the operator is coupled to the switch.

4. A ready indicator as recited in claim 3, wherein the second means further comprises
   fifth means for generating a fifth signal if the stored energy source is charged to move the switch to the second position.

5. A ready indicator as recited in claim 3, further comprising
   means for selectively determining the ability of the first indicating means to produce the human-sensible indication.

6. A ready indicator as recited in claim 5, wherein the second indicating means comprises
   indicia which instruct, in the event of the absence of the human-sensible indication, that the determining means is to be first operated followed by inspection of the switch, the switch operator, the control device and the system in a predetermined order if the first indicating means is capable of producing the human-sensible indication.

7. A ready indicator as recited in claim 1, wherein the first switch position is closed and the second switch position is open; and the stored energy source is charged to open the switch.

8. A ready indicator as recited in claim 1, wherein
the first switch position is open and the second switch position is closed, and
the stored energy source is charged to close the switch.

9. A ready indicator for switch-gear usable with a preferred high-voltage electrical source and an alternate high-voltage electrical source; the switch-gear having a normally closed first interrupter switch in series with the preferred source and a normally open second interrupter switch in series with the alternate source, the swtiches being selectively movable to respective open and closed positions by respective switch operators selectively energized by a selectively actuable control device responsive to electrical conditions of the sources, the indicator comprising:
first means for generating a first signal if the first switch is closed;
second means for generating a second signal if the second switch is open;
third means for generating a third signal if the first switch operator is capable of opening the first switch;
fourth means for generating a fourth signal if the second switch operator is capable of closing the second switch;
fifth means for generating a fifth signal if the control device is capable of energizing the switch operators; and
first indicating means for producing a human-sensible indication of the simultaneous generation of the signals.

10. A ready indicator as recited in claim 9 for switch-gear in which the switch operators are selectively coupleable to either switch and include stored energy sources which may be charged or uncharged, wherein
the third means comprises
sixth means for generating a sixth signal if the first operator is coupled to the first switch; and
the fourth means comprises
seventh means for generating a seventh signal if the second operator is coupled to the second switch.

11. A ready indicator as recited in claim 10, wherein
the third means further comprises
eighth means for generating an eighth signal if the stored energy source in the first operator is charged to open the first switch; and
the fourth means further comprises
ninth means for generating a ninth signal if the stored energy source in the second operator is charged to close the second switch.

12. A ready indicator as recited in claim 9 for switch-gear in which the switch operators are selectively coupleable to either switch and include stored energy sources which may be charged or uncharged, wherein
the third means comprises
sixth means for generating a sixth signal if one operator is coupled to one switch, and
seventh means for generating a seventh signal if the stored energy source in the one operator is charged to open the one switch; and
the fourth means comprises
eighth means for generating an eighth signal if the other operator is coupled to the other switch, and
ninth means for generating a ninth signal if the stored energy source in the other operator is charged to close the other switch.

* * * * *